United States Patent [19]

Beauhaire

[11] 4,135,782
[45] Jan. 23, 1979

[54] CONNECTION BAR FOR OPTICAL FIBRES

[75] Inventor: Pierre Beauhaire, Meudon la Foret, France

[73] Assignee: Compagnie Industrielle des Telecommunications Cit-Alcatel, Paris, France

[21] Appl. No.: 826,098

[22] Filed: Aug. 19, 1977

[30] Foreign Application Priority Data

Aug. 25, 1976 [FR] France .................. 76 25769

[51] Int. Cl.² ............................... G02B 5/14
[52] U.S. Cl. .................. 350/96.21; 174/84 S
[58] Field of Search ............. 350/96.21, 96.22; 174/84 R, 84 S, 93, 192, 198

[56] References Cited

U.S. PATENT DOCUMENTS

| 3,030,601 | 4/1962 | Krebs | 174/93 |
| 3,040,121 | 6/1962 | Gillemot | 174/93 |
| 4,030,809 | 6/1977 | Onishi et al. | 350/96.21 |

*Primary Examiner*—John K. Corbin
*Assistant Examiner*—Stewart Levy
*Attorney, Agent, or Firm*—Sughrue, Rothwell, Mion, Zinn and Macpeak

[57] ABSTRACT

The invention relates to a bar for connecting optical fibres. It is characterized in that it comprises a cylindrical alinement support having a groove disposed along one of its generating lines to receive the ends of the respective fibres and a ring installed round the support, split longitudinally for the insertion of the fibres and moving in rotation to maintain them in the groove. This bar enables a data transmission link to be formed by optical fibres.

10 Claims, 4 Drawing Figures

CONNECTION BAR FOR OPTICAL FIBRES

FIELD OF THE INVENTION

The invention relates to the field of data transmission by optical fibres. It concerns particularly a bar for the connection of two optical fibres and the constitution of a continuous long distance connection.

BACKGROUND OF THE INVENTION

The quality of a transmission system, using optical fibres as a transmission medium, is particularly affected by the quality of the couplings between successive sections of the fibre forming the transmission line. The coupling between two fiber ends must indeed meet numerous requirements, in particular axial alinement and short spacing between the front surfaces, at the connection. Further, the industrial use of optical fibres as a transmission medium requires that the connections between sections of fibres be easy and fast to make, while meeting the above requirements relating to the quality of the connection.

Means are known which ensure the connection between the ends of the pairs of fibres, constituted by an alinement support formed by a rectangular block one of whose surfaces — generally the large surface — has parallel grooves. The ends of two fibres to be connected are then fitted into each groove. The ends of the fibres are held in their grooves by means of a plate which is fixed on the alinement support and which covers the grooved face by applying a transverse pressure to the ends of the fibres.

Preferred embodiments of the present invention form a connection between fibres by implementing these same principles, they provide a simpler connection which is very easy to instal and re-instal.

SUMMARY OF THE INVENTION

The present invention provides a connection bar for optical fibres, comprising an alinement support having at least one groove for receiving the ends of each pair of fibres to be connected and means for holding the fibres in their grooves, wherein said alinement support is constituted by a cylindrical part on which each groove is disposed along a generating line and said holding means are constituted by a ring installed to surround the support, the ring being split longitudinally for the insertion of each end of fibre in its groove and rotatably mounted about said support to provide the transversal positioning of the ends of each pair of fibres.

Preferably, said alinement support has two first collars, one at each of its ends, and two second collars, one on either side of and at a short distance from the transversal centre plane of the alinement support, the said at least one groove passing through said first collars and second collars.

It is also preferred that said alinement support cooperates with semi-cylindrical cramps installed at its respective ends, extending it, and also with an end piece equipping each fibre end and having shoulders which abut on the front surface of the support and against an end surface of the corresponding cramp to provide precise longitudinal positioning of each end of fibre on said alinement support.

Other characteristics and the advantages of the present invention will become apparent from the description of an embodiment given by way of example with reference to the accompanying drawings.

DESCRIPTION OF THE PREFERRED EMBODIMENT

Figure 1:
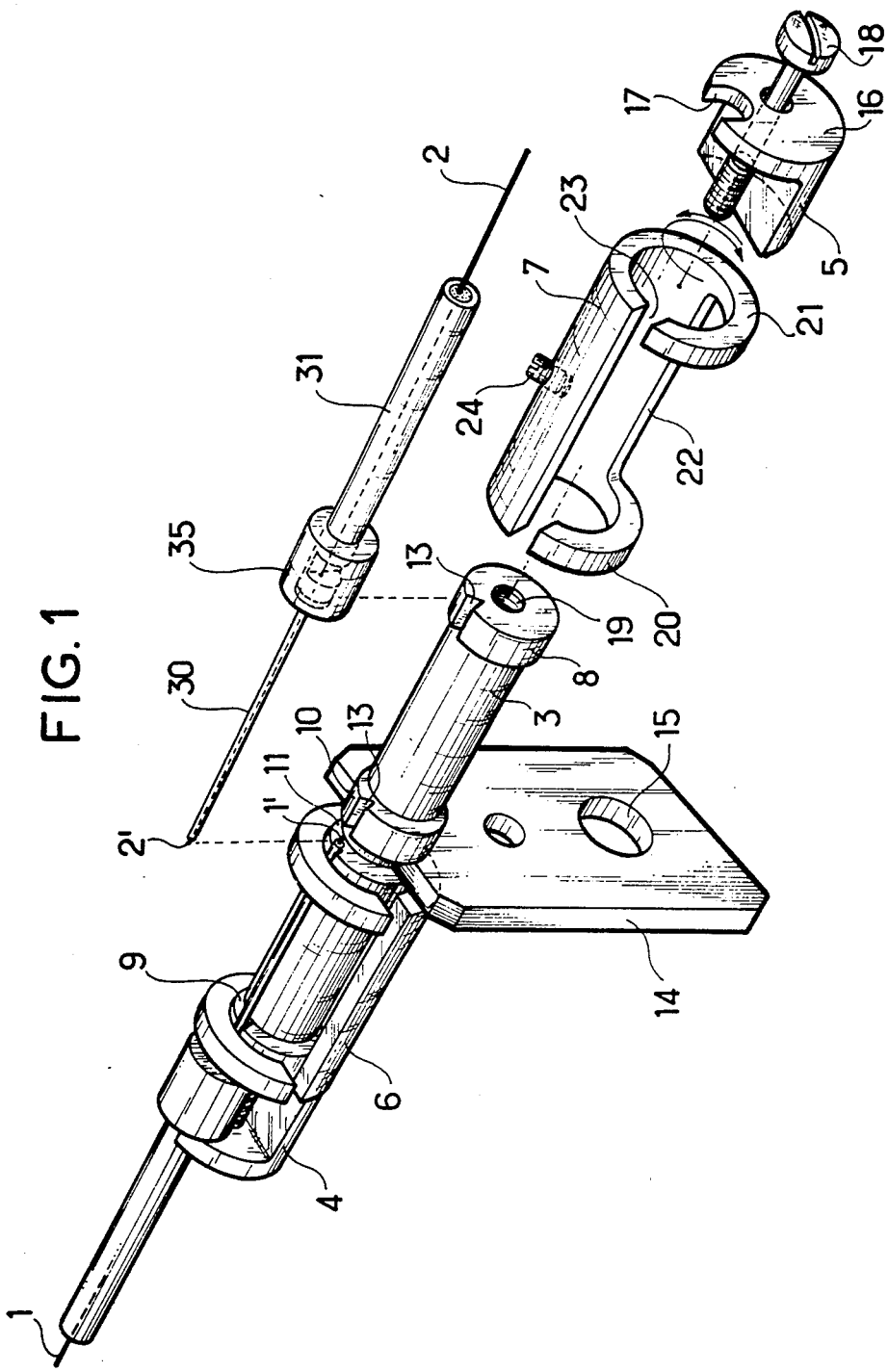
FIG. 1 is an exploded view of the connection bar embodying the invention.
Figure 3:
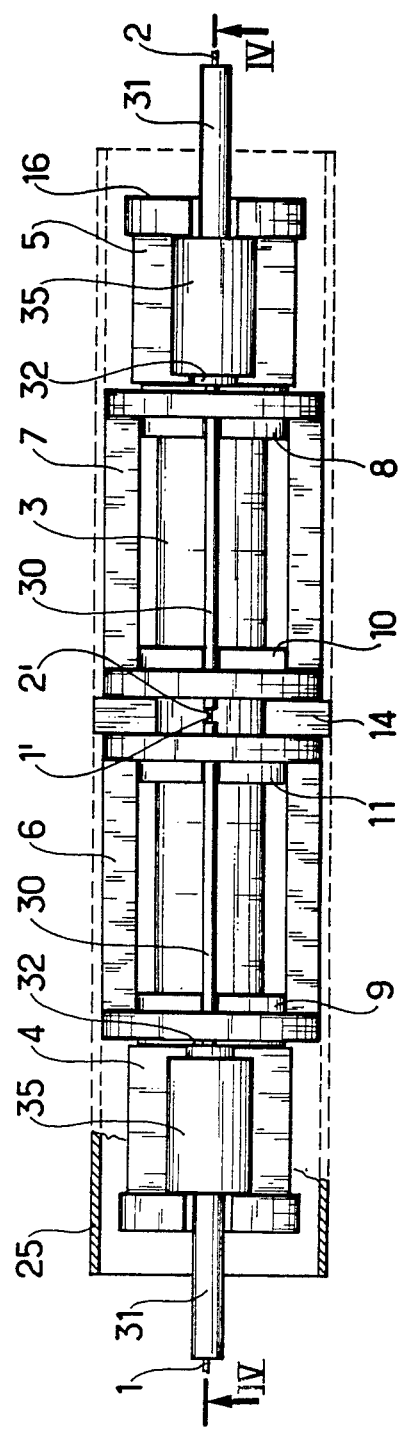
FIG. 3 is a top view of the connection bar according to FIG. 1.
Figure 4:
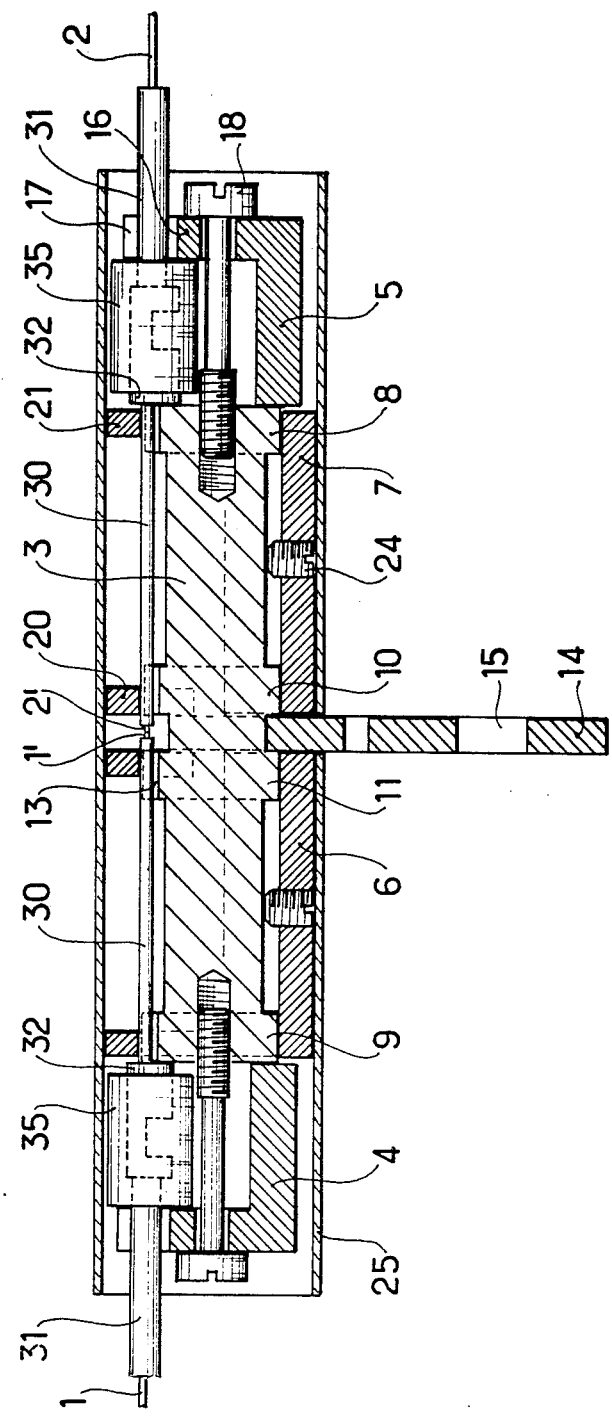
FIG. 4 is a cross-section of the connection bar along line IV—IV of FIG. 3.

In FIGS. 1, 3 and 4, it is seen that the bar ensures the connection of two fibres 1 and 2. It comprises mainly an alinement support 3, two identical cramps 4 and 5 for axially positioning the two ends of the respective fibres and two locking rings 6 and 7 which are also identical, for transversally positioning and maintaining the two ends of the fibres to be connected.

The alinement support 3 is constituted by a cylindrical body machined to form two first collars 8 and 9 respectively at its two ends and two second collars 10 and 11 respectively on either side and at a short distance from its transversal centre plane which constitutes the junction plane of the fibres 1 and 2. The support 3 also has a V-shaped groove 13, i.e. a groove with a triangular cross-section, formed in the collars along one of the generating lines of the support 3.

The support 3 also has a tab 14 fixed between the two collars 10 and 11. This tab 14 enables the fixing of the connection bar and/or of the alinement support during the fibre connection operation, on a mounting support not shown here. This tab 14 has, for this purpose, holes such as 15 for passing fixing screws on the mounting support.

The cramps 4 and 5 are each constituted by a semi-cylindrical part. For each cramp, e.g. the cramp 5, one of the front surfaces has a semicircular cross-section and abuts against the end surface of the corresponding end collar; the other front surface is constituted by a disc 16 having a notch 17 at its periphery. The disc 16 has a captive screw 18 passing through it. This screw 18 is inserted in an axial tapping formed at each end of the alinement support. The screw 18 and the complementary tapping 19 ensure that each cramp at the end of the support 3 is kept axially alined; the semi-circular front surface of the cramp is then applied to abut against the front surface of the end of the support 3, while the notch 17 is then in the extension of the groove 13.

The two rings 6 and 7 are each constituted by a semi-cylindrical part whose ends 20 and 21 are annular (ring 7). Between the annular ends, each of the rings therefore has a lateral window 22, substantially over half of its cross-section. Each of the rings has an inside diameter slightly greater than the diameter of the collars 8 and 10 or 9 and 11, which it covers while keeping the possibility of rotating on the collars with friction. Each ring also has a longitudinal slot or cut-out part 23 passing through the annular ends and opening on one side to the window 22; this cut-out part is delimited longitudinally on the other side by the semi-cylindrical part of the ring. This cut-out part, formed in the annular ends and opening to the window 22, confers a little resilience to said annular ends 20 and 21.

The two rings surround the alinement support 3 and are disposed on either side of the fixing tab 14 which acts as a stop for each of these rings.

Each ring also has a grub screw 24 passing through it which is inserted in a tapped passage of the lateral wall of the ring, substantially in its centre part. This screw 24 blocks rotation of the ring about the alinement support, when its end presses against the lateral surface of the support 3.

The connection bar is completed by a protective housing 25, not shown in FIG. 1, but shown in FIGS. 3 and 4. This protective housing 25 will for example be constituted by two tubes assembled together; these two tubes will be split suitably to leave between them the fixing tab on the outside and to cover completely the fibres, in particular at the connection plane.

Figure 2:
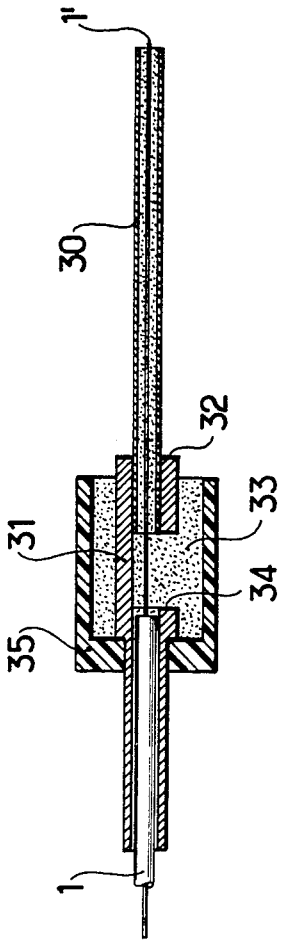
FIG. 2 is a cross-section of an end piece of a fibre to be connected.

The connection bar also co-operates with a pre-centring element for each fibre end, said pre-centring element constituting an end piece on the end of each fibre to be connected. This end piece equipping each fibre end is described more particularly with reference to FIG. 2. The references of the elements constituting it and which are visible in FIGS. 1, 3 and 4 have also been annotated therein.

The ends of the fibres to be connected have each previously been equipped with an end piece in which the end of the fibre is centred.

Each of the fibres, whose cores are for example made of doped silica and whose cladding is made for example of pure silica, are normally covered with a protective covering imparting great mechanical strength to it. The covered fibre was referenced hereinbefore 1 or 2. The end piece fitted to each end covers the previously bared fibre designated by the reference 1' or 2'.

The end piece of each fibre, e.g. the fibre 1 in FIG. 1 or the fibre 2 in FIG. 1, comprises a calibrated tube 30 installed on the bared end of the fibre and carried by a tube-carrying sleeve 31. This tube-carrying sleeve 31 is made integral with the protective covering of the fibre; it covers a bared portion of the fibre, between the ends of the calibrated tube and the protective covering of the fibre. The front end of the tube-carrying sleeve 31 forms a shoulder 32 on the tube; the distance between this shoulder and the front end surface of the fibre is perfectly defined as a function of the dimensions of the connection bar. A binding agent 33 inside the tube and the tube-carrying sleeve holds the fibre in the tube.

The tube-carrying sleeve 31 has a lateral hole or window 34 perpendicular to the bared portion of the fibre surrounded by this sleeve. This lateral hole enables the binding agent to be inserted inside the sleeve and the tube.

After the end of the fibre has been centred in the tube and its end face has been positioned at the proper distance from the shoulder 32, the binding agent holds the end of the fibre in the tube.

The end piece of the fibre also includes a cylindrical cap 35 through whose base the tube-carrying sleeve passes at the level of the covered fibre. This cap covers at least the part of the tube-carrying sleeve 31 having the lateral hole 34. It is used essentially for the insertion of the binding agent in the tube-carrying sleeve and the tube: the end piece being held vertical, this binding agent, chosen advantageously from among polymerisable cements, is injected into the cap, spreads into the sleeve and rises by capillary action into the tube, between the tube and the bared fibre.

The two fibres are connected together as follows:

Initially, each locking ring 6 or 7, being free to rotate on the alinement support, is positioned so that its longitudinal cut-away part 23 lies over the V-shaped groove 13 of the support. Each cramp 4 or 5 is least partly loosened. The end piece of one of the fibres is inserted through the cut-out part 23 into the groove 13; the end of this fibre is then approximately at the level of the junction plane of the fibres, while the rear portion of the tube-carrying sleeve 31 is recessed in the notch 17 of the cramp then loosely assembled on the alinement support 3.

The cap 35 is received in the cramp, the base of the cap bearing against the inside surface of the end disc 16 of the cramp. The two end pieces of the fibre are inserted in the bar identically.

Each of the two cramps 4 and 5 is then tightened on the alinement support 3 by means of each of the screws such as 18. Each cramp and the shoulder 32 of each end piece of fibre effectively press against the respective end faces of the support 3 and the base of the cap 35 also effectively presses against the end disc of the corresponding cramp. The fibres are therefore positioned axially and held in the bar. It will be seen, with respect to this position, that the distance between each shoulder 32 and the end surface of the fibre is defined so as to correspond to half the length of the alinement support, to within half the distance maintained between two front surfaces of the fibres. It will also be seen that the length of each cramp and that the distance between the base of the cap 35 and the front surface of the shoulder 32 correspond to each other.

The transversal positioning of the fibres in the groove 13 is ensured by turning each of the locking rings 6 and 7 which abut against the tab 14. The annular ends of each ring then press against the calibrated tube of each end piece and press it into the bottom of the groove. The rotation of the rings 6 and 7 is then blocked by means of the grub screws such as 24, and the protective housing 25 is installed on the connection bar.

This connection has more particularly the advantage of being simple to produce. Moreover, the insertion of the ends of the fibre in the groove through the cut-away parts 23 of the rings avoids damage to the end surfaces of the fibres whose surface condition was necessarily perfect previous to the connection, such damage being possible during insertion by sliding the ends in an inside channel.

The invention has been described with reference to an example of an embodiment given in the accompanying drawing. It is possible, without going beyond the scope of the invention, to modify some details. In particular, several grooves, such as the groove 13, can be provided on the alinement support, these grooves always being disposed along the generating lines of the alinement support. The cramp could also have several notches such as 17, separated from one another according to the relative disposition of the grooves. The ends of each pair of fibres will then be installed in the bar through the slot of each installed ring, by rotating the ring, successively adjacent to the slots.

What we claim is:

1. A connection bar for optical fibres, comprising an alignment support having at least one groove for receiving the ends of each pair of fibres to be connected and means for holding the fibres in their grooves, the improvement wherein: said alignment support is constituted by a cylindrical part on which said at least one groove is disposed along a generating line and said holding means are constituted by a ring installed around the support, the ring being split longitudinally for the insertion of each end of fibre in its groove and means for rotatably mounting said ring about said support to provide the transversal positioning of the ends of each pair of fibres.

2. A connection bar according to claim 1, wherein said alignment support comprises two first collars, one at each of its ends, and two second collars, one on either side of and at a short distance from the transversal centre plane of the alignment support, and wherein said at least one groove passes through said first collars and second collars.

3. A connection bar according to claim 2, wherein said ring has, between one of said first collars and one of said second collars, situated on the same side of the centre plane of said alignment support, a lateral window leading into said split and delimiting on said ring annular portions respectively perpendicular to said collars.

4. A connection bar according to claim 3, wherein a transversal is carried by said alignment support between said second collars and said ring is in two parts, said parts being respectively installed abutting on either side against said transversal tab.

5. A connection bar according to claim 4, further including an axial positioning element for said ends of each pair of fibres, each element constituting an end piece on each fibre having a calibrated tube in which the front face of the fibre is substantially coplanar with the end of the tube and is held centred therein, said calibrated tube having a shoulder at a defined distance from the front face of the fibre and abutting against the corresponding end surface of said alinement support.

6. A connection bar according to claim 5, further including a semi-cylindrical cramp fixed on said alignment support at each of its ends and in its extension in abutment against the front surface of said support, said cramp forming, on the outer side in relation to said support, a front disc whose periphery is notched to accomodate a corresponding fiber end piece.

7. A connection bar according to claim 6, wherein the fiber end has a second shoulder, and wherein the distance between the outside surfaces of said shoulders corresponding to the length of the cramp.

8. A connection bar according to claim 1, wherein said ring carries means for blocking its rotation on said alinement support.

9. A connection bar according to claim 1, wherein each groove is of V-shaped cross-section.

10. A connection bar according to claim 7, wherein said ring carries means for blocking its rotation on said alignment support.

* * * * *